United States Patent
Mylavarapu et al.

(10) Patent No.: US 10,929,211 B1
(45) Date of Patent: Feb. 23, 2021

(54) IDENTIFICATION AND TRACEABILITY OF APPLICATION PROGRAMMING INTERFACE (API) FUNCTIONALITY IN A DISTRIBUTED COMPUTING ENVIRONMENT

(71) Applicant: FMR LLC, Boston, MA (US)

(72) Inventors: Mahesh Kumar Mylavarapu, Morrisville, NC (US); Kevin Yan, Cary, NC (US); John Cominio, Apex, NC (US); Santosh Kumar, Lebanon, NH (US); Mark Lambert, Londonderry, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/994,328

(22) Filed: Aug. 14, 2020

(51) Int. Cl.
*G06F 9/54* (2006.01)
*G06F 8/41* (2018.01)

(52) U.S. Cl.
CPC .............. *G06F 9/547* (2013.01); *G06F 8/427* (2013.01)

(58) Field of Classification Search
None
See application file for complete search history.

(56) References Cited

U.S. PATENT DOCUMENTS

| | | |
|---|---|---|
| 8,577,914 B2 | 11/2013 | Hossain et al. |
| 9,104,525 B2 | 8/2015 | Dang et al. |
| 10,013,331 B2 | 7/2018 | Brodsky et al. |
| 10,169,035 B1 | 1/2019 | Caspi |
| 10,216,812 B2 | 2/2019 | Witkop et al. |
| 2013/0239096 A1* | 9/2013 | Pesarese |
| 2017/0060910 A1 | 3/2017 | Budhiraja et al. |
| 2018/0121320 A1 | 5/2018 | Dolby et al. |
| 2019/0324731 A1 | 10/2019 | Zhou et al. |
| 2020/0133744 A1* | 4/2020 | MacLoed |

* cited by examiner

*Primary Examiner* — Syed A Roni
(74) *Attorney, Agent, or Firm* — Proskauer Rose LLP

(57) ABSTRACT

Methods and apparatuses are described for identification and traceability of application programming interface (API) functionality in a distributed computing environment. A server retrieves source code comprising API calls from source code repositories, and parses the source code to identify a first set of APIs, each having one or more attributes. The server retrieves API definitions and parses the API definitions to identify a second set of APIs, each having one or more attributes. The server compares the first set of APIs and the second set of APIs to determine matching APIs. Using the matching APIs, the server detects backend systems associated with each API and generates a call graph for each API by traversing abstract syntax trees (ASTs) associated with the source code. The server builds an API model object for each API, comprising the attributes of the API, the detected backend systems, and the call graph.

24 Claims, 14 Drawing Sheets

```
{
  "refreshTime" : "2020-07-04 13:44:23 EDT",
  "applicationName" : <app-name>,
  "applicationNameUrl" : <app-url>,
  "repoName" : <repo-name>,
  "gitActualBranch" : "feature/branch1",
  "gitDefaultBranch" : "develop",
  "platform" : "C2C",
  "pointingTo" : null,
  "project" : "PR100760",
  "stashRepoName" : null,
  "component" : <component-name>,
  "componentUrl" : <component-url>,
  "realComponent" : <real-component>,
  "groupId" : <group-id>,
  "version" : "3.5.5",
  "framework" : <framework>,
  "frameworkVersion" : "8.2.3",
  "pomFile" : <pom-File-link>,
  "dbprocs" : [ { ... } ],            ◄──────── 402
  "resourceDetails" : [ { ... } ],    ◄──────── 404
  "resources" : [ { ... } ],
  "dependencies" : [ { ... } ],
  "consumers" : [ { ... } ],
  "config" : [ { ... } ],
  "port" : "1234",
  "stash" : [ { ... } ],
  "apigw" : [ ],
  "healthDetails" : [ ],
  "swaggerUrls" : [ ],
  "wsdlUrls" : [ ],
  "stashUrl" : <stash-url>,
  "jenkinsUrl" : <jenkins-url>,
  "artifactoryUrl" : <artifactory-url>,
  "splunkUrl" : <splunk-url>,
  "sonarUrl" : <sonar-url>,
  "apigwUrl" : null,
  "sspd" : [ { ... } ],
  "sspdUrl" : null,
  "sspdEmails" : null,
  "sspdJenkinsUrl" : null,
  "sspdSonarUrl" : null,
  "sspdMaturityLevel" : null,
  "sspdGoLiveJnekinsUrl" : null,
  "endpoints" : [ ],
  "tokens" : [ ],
  "ctx" : null,
  "envsList" : null,
  "repoMatch" : null,
  "artifactIdMatch" : null,
  "udCompMatch" : null,
  "udcomp" : { },
  "cmList" : [ ],
  "udeployUrl" : <udeploy-url>,
}
```

FIG. 4A

```
"dbprocs" : [ {
    "name" : "{#{DOMAIN_APP_TAB, mode=OUT,
jdbcType=ARRAY,
jdbcTypeName=APPSPECIFICDBO.DOMAIN_APP_TAB,
javaType=java.lang.Object, typeHandler=com.xyz.service.
app.data.boundary.dao.mybatis.handler.AppDataHandler}=cal
l APPSPECIFICDBO.APP_DATA_PKG.aip_get_app_data(#{p_mid,
mode=IN, jdbcType=VARCHAR, javaType=String},#{p_domains,
mode=IN, jdbcType=ARRAY,
jdbcTypeName=APPSPECIFICDBO.DOMAIN_TAB,
javaType=java.lang.Object,
typeHandler=com.xyz.service.app.data.boundary.dao.mybatis
.handler.DomainTypeHandler})}",
    "shortName" :
"APPSPECIFICDBO.APP_DATA_PKG.aip_get_app_data",
    "daoMethod" : "getApplicationData(java.util.Map)",
    "daoMethodPosition" : <method-url>,
    "daoMethodQualified" : "com.xyz.service.
app.data.boundary.dao.mybatis.mapper.read.AppDataMapper",
    "controllerMethod" : "getAppData(com.xyz.service.
app.data.rest.model.AppDataRequest)",
    "controllerMethodPosition" : <controller-method-url>,
    "controllerMethodQualified" :
"com.xyz.service.app.data.rest.AppDataController",
    "controllerResource" : <URL>,
    "controllerResourceMethod" : "POST"
  }, {
<dbproc2>,
<dbproc3>,
…
}
```

FIG. 4B

```
"resourceDetails" : [ {
    "name" : null,
    "shortName" : null,
    "daoMethod" : null,
    "daoMethodPosition" : null,
    "daoMethodQualified" : null,
    "controllerMethod" :
"getAppData(com.xyz.service.app.data.rest.model.AppDataRe
quest)",
    "controllerMethodPosition" : <controller-method-url>,
    "controllerMethodQualified" :
"com.xyz.service.app.data.rest.AppDataController",
    "controllerResource" : <URL>,
    "controllerResourceMethod" : "POST"
  }, {
<resourceDetails2>,
<resourceDetails3>,
…
}
```

IDENTIFICATION AND TRACEABILITY OF APPLICATION PROGRAMMING INTERFACE (API) FUNCTIONALITY IN A DISTRIBUTED COMPUTING ENVIRONMENT

TECHNICAL FIELD

This application relates generally to methods and apparatuses, including computer program products, for identification and traceability of application programming interface (API) functionality in a distributed computing environment.

BACKGROUND

Most medium and large enterprise computing environments rely on a wide variety of application programming interfaces (APIs) to enable disparate computing systems to communicate with each other for the purposes of enabling robust software applications and functionality. As a result, it is critical to comprehensively understand the scope and usage of all APIs in a production computing environment. Particularly as frequent changes to source code and related software dependencies occur, a lack of awareness of the enterprise's roster of API functionality can result in unexpected or incorrect behavior of certain APIs—which could lead to production software instability and system errors.

Many entities attempt to generate documentation on the APIs in use by their computing environments, including aspects such as identification of API endpoints, reliance or invocation of underlying backend database procedures, API consumers, hosted servers, and the like. However, such documentation efforts typically rely on a significant amount of effort on behalf of developers and quality assurance staff to keep such documentation up to date, and often the documentation is still incomplete.

SUMMARY

Therefore, what is needed are methods and systems for providing automatic discovery, identification, and traceability of APIs and related metadata that are used in a distributed production computing environment—thereby eliminating the effort and the inaccuracies associated with developer generation of API documentation. The techniques described herein advantageously scan source code management systems and repositories, application lifecycle management (ALM) tools, and other systems that house API artifacts to generate an end-to-end lineage of each API. The lineage provides a current and accurate representation of the API as used in the production environment, including consumers that invoke the API and backend systems which the API invokes. Importantly, no source code modifications are required; instead, the methods and systems beneficially utilize automatic source code parsing using abstract syntax trees (ASTs) to discover detailed information on the APIs. And, this approach can be scaled to any number of APIs and can be leveraged on other programmatic elements beyond APIs.

The systems and methods further enable the construction of a neutral model of each API, representing all the needed information for an API such as HTTP resources, request and response objects, database procedures, validations, and so forth. It should be appreciated that the neutral API model is technology- and language-independent. As a result, the neutral API model can be used to migrate/re-generate an API on target platforms by applying any transformations to enhance non-functional capabilities (performance or security or maintainability) of an API. It should be appreciated that the techniques described herein empower all API stakeholders—not just developers. With the availability of a client-based user interface that provides complete and comprehensive live API information in a secured manner, developer efficiency and productivity is significantly improved. For example, many day-to-day queries and tasks, which used to take several minutes, are completed in just few clicks.

The invention, in one aspect, features a system for identification and traceability of application programming interface (API) functionality in a distributed computing environment. The system comprises a server computing device having a memory for storing computer-executable instructions and a processor that executes the computer executable instructions. The server computing device retrieves source code comprising one or more API calls from a plurality of source code repositories. The server computing device parses the retrieved source code to identify a first set of APIs referenced by the one or more API calls, each API in the first set of APIs having one or more attributes. The server computing device retrieves one or more API definitions from an application deployment tool. The server computing device parses the retrieved API definitions to identify a second set of APIs, each API in the second set of APIs having one or more attributes. The server computing device compares the first set of APIs and the second set of APIs using the respective attributes of each API to determine a set of matching APIs. Using the set of matching APIs, the server computing device detects one or more backend systems associated with each API in the set of matching APIs. The server computing device generates a call graph for each API in the set of matching APIs by traversing one or more abstract syntax trees (ASTs) associated with the source code of the set of matching APIs, the call graph comprising an end-to-end lineage for the API. The server computing device builds an API model object for each API in the set of matching APIs, the API model object comprising (i) the one or more attributes of the API, (ii) the detected backend systems associated with the API, and (iii) the call graph for the API. The server computing device stores the API model object for each API in an API lineage repository.

The invention, in another aspect, features a computerized method of identification and traceability of application programming interface (API) functionality in a distributed computing environment. A server computing device retrieves source code comprising one or more API calls from a plurality of source code repositories. The server computing device parses the retrieved source code to identify a first set of APIs referenced by the one or more API calls, each API in the first set of APIs having one or more attributes. The server computing device retrieves one or more API definitions from an application deployment tool. The server computing device parses the retrieved API definitions to identify a second set of APIs, each API in the second set of APIs having one or more attributes. The server computing device compares the first set of APIs and the second set of APIs using the respective attributes of each API to determine a set of matching APIs. Using the set of matching APIs, the server computing device detects one or more backend systems associated with each API in the set of matching APIs. The server computing device generates a call graph for each API in the set of matching APIs by traversing one or more abstract syntax trees (ASTs) associated with the source code of the set of matching APIs, the call graph comprising an end-to-end lineage for the API. The server computing device builds an API model object for each API in the set of matching APIs, the API model object comprising (i) the one or more attributes of the API, (ii) the detected backend systems associated with the API, and (iii) the call graph for the API. The server computing device stores the API model object for each API in an API lineage repository.

Any of the above aspects can include one or more of the following features. In some embodiments, the source code corresponds to a software application executing in a production computing environment. In some embodiments, the one or more attributes of each API in the first set of APIs and the one or more attributes of each API in the second set of APIs comprises one or more of: a name, a version, an artifactid, a groupid, a tokenid, or a link to an application lifecycle management (ALM) tool associated with the API. In some embodiments, comparing the first set of APIs and the second set of APIs using the respective attributes of each API to determine a set of matching APIs comprises: for each API in the first set of APIs, comparing one or more attributes of the API to corresponding attributes of each API in the second set of APIs to determine whether the attributes match and generating a first subset of matching APIs; for each API in the second set of APIs, comparing one or more attributes of the API to corresponding attributes of each API in the first set of APIs to determine whether the attributes match and generating a second subset of matching APIs; filtering the first subset of matching APIs and the second subset of matching APIs to identify one or more APIs common to the first subset of matching APIs and the second subset of matching APIs; and generating the set of matching APIs using the identified one or more APIs common to the first subset of matching APIs and the second subset of matching APIs.

In some embodiments, detecting one or more backend systems associated with each API in the set of matching APIs comprises scanning the application deployment tool to identify one or more backend systems invoked by the API. In some embodiments, the call graph comprises one or more HTTP endpoints associated with the API, one or more consumers of the API, and one or more requests of the API, one or more responses of the API. In some embodiments, the server computing device generates a user interface on a remote computing device for display of data associated with the API model objects. In some embodiments, the user interface comprises a summary of APIs used by the software application in the production computing environment. In some embodiments, the user interface comprises a list of application lifecycle management (ALM) tools associated with an API. In some embodiments, the user interface comprises a health status of a plurality of APIs in one or more computing environments. In some embodiments, the user interface comprises end-to-end traceability information for one or more APIs. In some embodiments, the user interface comprises a list of development change tickets associated with one or more APIs.

In some embodiments, the server computing device detects one or more anomalies in the API model object for one or more APIs and transmits a notification message to an incident management system, wherein the incident management system generates one or more issue tickets based upon the detected anomalies.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4A is an exemplary API model object generated by the API model object generation module.

FIG. 4B is an exemplary dbprocs section of the API model object.

FIG. 4C is an exemplary resourceDetails section of the API model object.

FIG. 6B is a screenshot of a user interface for displaying one or more ALM tools associated with an API.

FIG. 6G is a screenshot of a user interface for displaying API consumer information and contact points.

DETAILED DESCRIPTION

Figure 1:
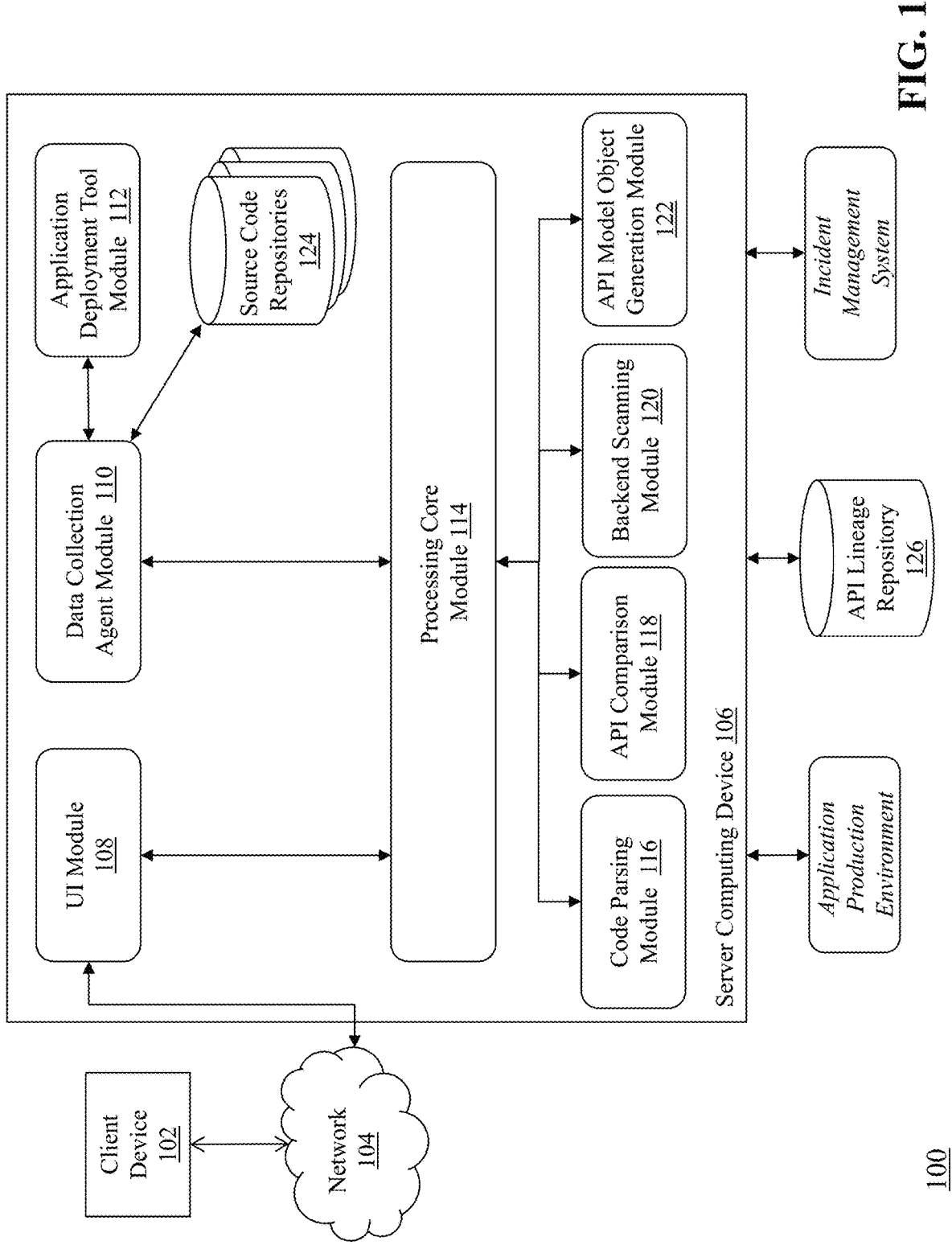
FIG. 1 is a block diagram of a system for identification and traceability of application programming interface (API) functionality in a distributed computing environment.

FIG. 1 is a block diagram of a system 100 for identification and traceability of application programming interface (API) functionality in a distributed computing environment. The system 100 includes one or more client computing devices (e.g., client device 102) that is coupled via communications network 104 to the server computing device 106. The server computing device 106 includes a user interface (UI) module 108, a data collection agent module 110, an application deployment tool module 112, a processing core module 114, a code parsing module 116, an API comparison module 118, a backend scanning module 120, and an API model object generation module 122. The server computing device 106 also includes a plurality of source code repositories 124. The server computing device is coupled to an API lineage repository 126.

The client computing device 102 connects to the communications network 104 in order to communicate with the server computing device 106 to provide input and receive output relating to the process of identification and traceability of API functionality in a distributed computing environment as described herein. The client computing device 102 is coupled to a display device (not shown). For example, the client computing device 102 can provide a detailed graphical user interface (GUI) via the display device that presents output resulting from the methods and systems described herein, where the GUI is utilized by an operator to review data associated with the process of identification and traceability of API functionality in a distributed computing environment.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables the other components of the system 100 to communicate with each other in order to perform the process of identification and traceability of API functionality in a distributed computing environment as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the 100 to communicate with each other.

The server computing device 106 is a combination of hardware, including one or more special-purpose processors and one or more physical memory modules, and specialized software modules—such as UI module 108, data collection agent module 110, application deployment tool module 112, processing core module 114, code parsing module 116, API comparison module 118, backend scanning module 120, and API model object generation module 122—that execute on the processor of the server computing device 106, to receive data from other components of the system 100, transmit data to other components of the system 100, and perform functions for identification and traceability of API functionality in a distributed computing environment as described herein.

In some embodiments, the modules 108 through 122 are specialized sets of computer software instructions programmed onto a dedicated processor in the server computing device 106 and can include specifically-designated memory locations and/or registers for executing the specialized computer software instructions. Further explanation of the specific processing performed by the modules 108 through 122 will be provided below.

The source code repositories 124 comprise transient and/or persistent memory for data storage, that is used in conjunction with the process of identification and traceability of API functionality in a distributed computing environment as described herein. Generally, the source code repositories 124 comprise source code management (SCM) systems that are configured to store and manage software application code files, artifacts, libraries, version control mechanisms, function calls, configuration files, metadata, and other elements that make up one or more software applications. In some embodiments, all or a portion of the source code repositories 124 can be integrated within the server computing device 106 (as shown in FIG. 1) or be located on a separate computing device or devices. In some embodiments, the source code repositories 124 are hosted on one or more remote computing devices (e.g., cloud-based architecture) that are accessible to the server computing device 106. Exemplary source code repositories include Git (available at git-scm.com) and Mercurial (available from mercurial-scm.org). Also, as shown in FIG. 1, certain modules in the server computing device can be coupled (via network) to one or more external applications, services, providers, and/or ecosystems (e.g., Application Production Environment, Incident Management System)—as will be described in detail below.

The API lineage repository 126 is a database system that stores certain data elements relating to the features and lineage of each API discovered and tracked by the system 100. For example, the API lineage repository 126 can store API model objects as data structures that represent details associated with a particular API—such as API name, API version, token(s), framework details, links to application lifecycle management (ALM) tools, API endpoints, API requests, API responses, API consumers, related backend systems such as database procedures and HTTP endpoints, and the like. The API lineage repository 126 can be used by the UI module 108 for the generation of one or more user interface screens that contain information from the API lineage repository 126 for presentation on, e.g., client device 102, as will be explained in greater detail below.

Figure 2:
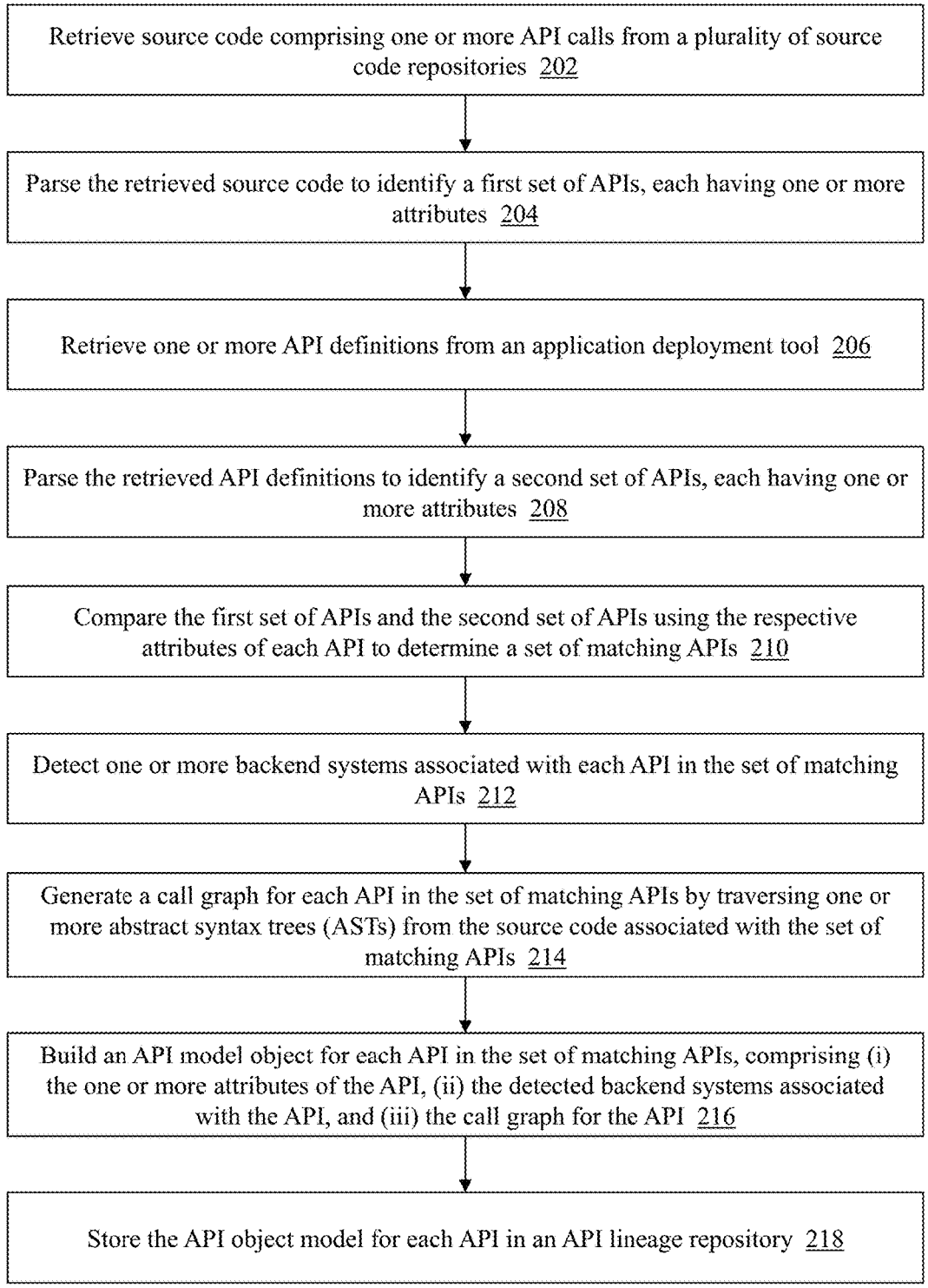
FIG. 2 is a flow diagram of a computerized method of identification and traceability of API functionality in a distributed computing environment.

FIG. 2 is a flow diagram of a computerized method 200 of identification and traceability of API functionality in a distributed computing environment, using the system 100 of FIG. 1. The data collection agent module 110 of server computing device 106 retrieves (202) source code comprising one or more API calls from a plurality of source code repositories 124. As can be appreciated, a software application can comprise source code that invokes or calls an application programming interface in order to interface with another computing system or resource. For example, an API call can comprise a function that creates and issues a request (e.g., via HTTP or HTTPS) to the remote computing system for retrieval of data. The API call may include one or more parameters (such as key-value pairs) that relate to the data requested from the remote system. In one example, the data collection agent module 110 can be configured to retrieve source code files from the source code repositories 124 that include one or more API calls embedded in the code.

The data collection agent module 110 transfers the retrieved source code to the processing core module 114, which invokes the code parsing module 116 to parse (204) the retrieved source code to identify a first set of APIs, each having one or more attributes. The code parsing module 116 can traverse one or more files comprising the retrieved source code to locate API calls within the code. In one embodiment, the API calls in the source code are defined using a particular naming convention that distinguishes the API calls from other types of functions and procedure calls in the code. For example, an API call may include the naming token "MDM_JDBC_POOL_NAME" and the code parsing module 116 can be configured to recognize this token (by parsing the code to identify the token string) and to, e.g., capture the location in source code for all references to this naming token as being associated with the same API. In addition, when the code parsing module 116 detects an API call, the module 116 can retrieve certain attributes associated with the API from, e.g., the source code repositories 124. These attributes relate to the features and functionality of the API, and can include specific data elements such as a name, a version, an artifactid, a groupid, a tokenid, or a link to an application lifecycle management (ALM) tool (such as Jenkins, Artifactory, etc.) associated with the API. It should be appreciated that other API attributes can be included within the scope of invention.

The data collection agent module 110 then retrieves (206) one or more API definitions from the application deployment tool module 112. An exemplary application deployment tool module 112 is IBM UrbanCode Deploy (uDeploy). The data collection agent module 110 can query the application deployment tool module 112 to retrieve, e.g., a plurality of API definitions that are used or deployed in the environment of a particular software application. In some embodiments, the data collection agent module 110 further retrieves certain attributes relating to each API definition, such as name, version, artifactid, groupid, tokenid, link to ALM tool, etc. The data collection agent module 110 transfers the API definitions (and related attributes) retrieved from the application deployment tool module 112 to the core processing module 114, which parses (208) the retrieved API definitions to identify a second set of APIs, each API having one or more attributes as mentioned above.

The core processing module 114 then invokes the API comparison module 118 to compare (210) the first set of APIs (generated from the code scanning module 116) and the second set of APIs (generated from the application deployment tool module 112), using the respective attributes of each API, to determine a set of matching APIs. As can be appreciated, in some instances an API may be represented in one or more of the source code repositories 124 but not represented in the application deployment tool module 112 (and vice versa). Therefore, in one embodiment, the API comparison module 118 can conduct two-level matching to determine the set of matching APIs that most closely relate to the actual set of APIs used in the corresponding software application. In this context, the two-level matching procedure comprises a bottom-up match process and a top-down match process. The bottom-up match process includes for each API in the first set of APIs generated by the code parsing module 116, comparing one or more attributes of the API to corresponding attributes of each API in the second set of APIs generated by the application deployment tool module 112 to determine whether the attribute(s) match and generating a first subset of matching APIs (that comprises one or more APIs from the first set of APIs). The API comparison module 118 can compare one or more key attributes; for example, the module 118 can determine that an API attribute such as Project Object Model (POM) artifactid (e.g., from a Maven software project management system) matches between an API in the first set of APIs and the second set of APIs. Therefore, the module 118 can include this API in the first subset of matching APIs. In one example, the API comparison module 118 initializes by prefetching all the available API information such as name of the API and its environments. In the first phase (bottom up), all the source code repositories are cloned (e.g., from the repositories themselves) and are scanned to check if they are APIs or not (for example: check to see if pom.xml exists for Maven-based projects). If they are APIs, then they will be matched against a prefetched list of APIs from the deployment tool using various attributes including, but not limited to, name of artifact, name of API, etc. to determine if they should be considered for further processing. This process filters out unwanted APIs, proof-of-concept/research projects and other non-API projects in the first place. In the second phase (top down), the API comparison module 118 checks these first set of APIs against deployment tool information across all environments (Dev, Test, Performance, UAT, and Production) to see if these APIs are really deployed in those environments and compares build numbers/Docker images in those environments and also checks if they are taking live traffic. As an example, an API may be deployed on private and public clouds but traffic is routed to the public cloud in Dev/Test environments and private cloud in Production environments (via traffic routing systems such as Apache Nginx/F5).

The top-down match process includes for each API in the second set of APIs generated by the application deployment tool module 112, comparing one or more attributes of the API to corresponding attributes of each API in the first set of APIs generated by the code parsing module 116 to determine whether the attribute(s) match and generating a second subset of matching APIs (that comprises one or more APIs from the second set of APIs). The API comparison module 118 can compare one or more key attributes and as explained above, when the key attribute(s) match, the module 118 can include this API in the second subset of matching APIs. It should be appreciated that during the bottom-up match process and the top-down match process, the module 118 can apply contextualized transformations to the API attributes in order to determine whether a match exists. Then, the API comparison module 118 can filter the first subset of matching APIs and the second subset of matching APIs to identify one or more APIs common to the first subset of matching APIs and the second subset of matching APIs and generate the set of matching APIs using the identified one or more APIs common to the first subset of matching APIs and the second subset of matching APIs.

When the set of matching APIs is determined, the core processing module 114 transmits a notification to the data collection agent module 110 to initiate deep parsing for each API in the set of matching APIs in order to build an API model object for each API, as described below. The core processing module 114 then invokes the backend scanning module 120, which detects (212) one or more backend systems associated with each API in the set of matching APIs. In one embodiment, the backend scanning module 120 can utilize one or more attributes of the API to scan the application deployment tool module 112 and/or other software development and deployment systems to identify backend systems (e.g., database procedures, HTTP-based endpoints, services, Java Message Service (JMS) or other middleware, other types of dependencies) that are connected to, consumed, and/or utilized by the API. Upon identifying the backend systems, the backend scanning module 120 can store data relating to the identified backend systems (e.g., identifiers, addressing information, etc.) to be used by the API model object generation module 122 as described below.

The API model object generation module 122 receives the set of matching APIs (including the related attributes) and the identified backend systems from the core processing module 114, and the module 122 creates an API model object for each API in the set of matching APIs. First, the module 122 generates (214) a call graph (also known as a call tree) for each API in the set of matching APIs by traversing one or more abstract syntax trees (ASTs) from the source code associated with the set of matching APIs. As can be appreciated, abstract syntax trees are tree representations of the syntactic structure of the underlying source code. These ASTs can be generated by the application deployment tool module 112 and/or stored in the source code repositories 124 during development and compilation of the associated software application. The API model object generation module 122 can be configured to traverse the ASTs to generate a call graph for each API—where the call graph includes a representation of the calling relationships between the API and other functions, subroutines, etc. in the software application.

Figure 3:
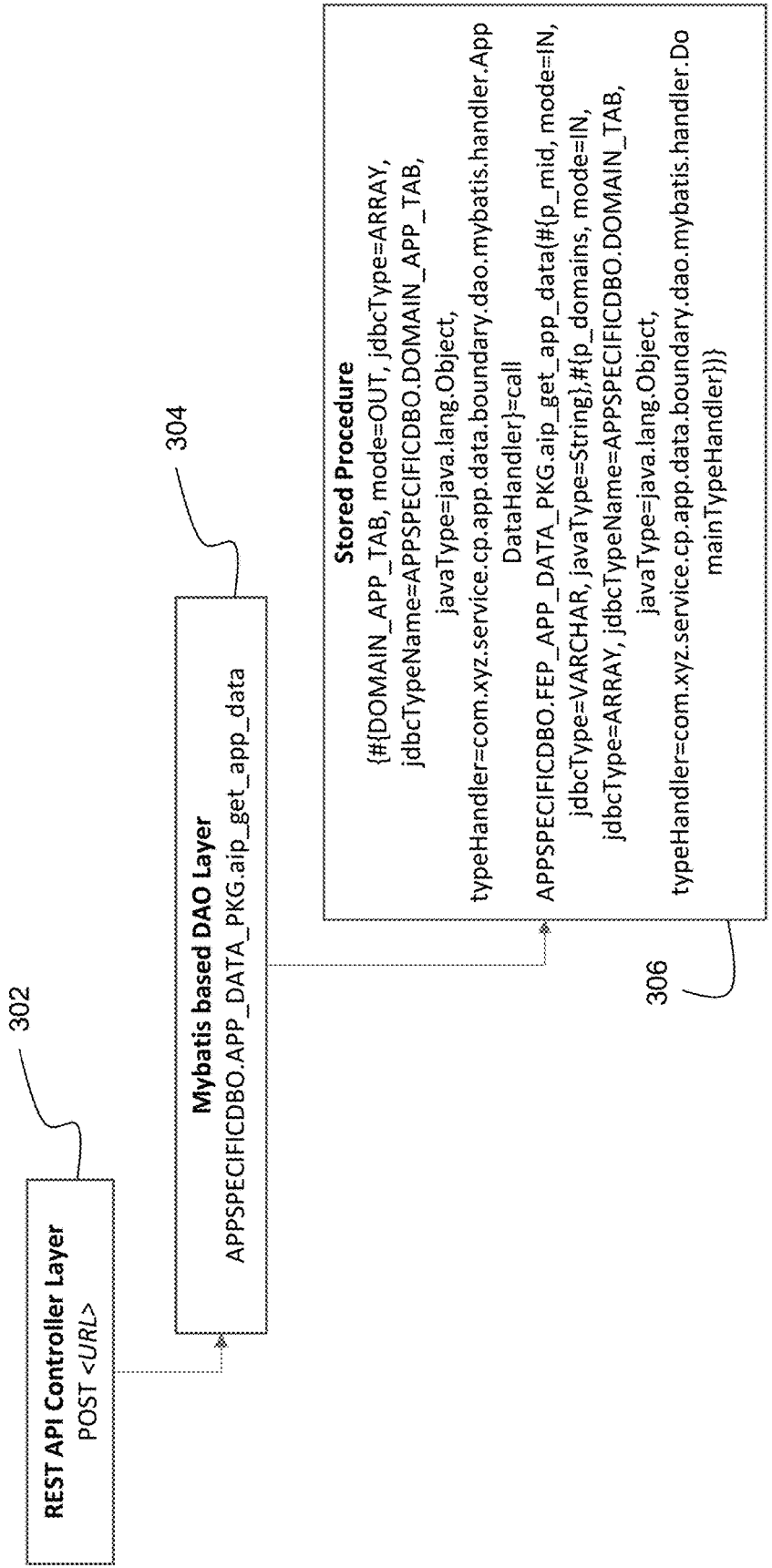
FIG. 3 is an exemplary call graph generated by the API model object generation module after traversal of the abstract syntax tree (AST).

FIG. 3 is an exemplary call graph generated by the API model object generation module 122 after traversal of the AST. As can be seen, the call graph represents an end-to-end lineage of the API—showing all related consumers, dependencies, and other touchpoints that relate to or impact the API—thereby providing a complete picture of the API in the context of the overall software application. As shown in FIG. 3, the call graph depicts the Representational State Transfer (REST) API Controller layer 302, the Mybatis based Data Access Object (DAO) layer 304, and the underlying Stored Procedure 306.

Once the API model object generation module 122 has generated the call graph for each API as noted above, the module 112 builds (216) an API model object for each API in the set of matching APIs. The API model object comprises (i) the one or more attributes of the API, (ii) identification of the detected backend systems associated with the API, and (iii) the call graph for the API. FIG. 4A is an exemplary API model object (represented in JavaScript Object Notation (JSON)) as generated by the API model object generation module 122. As shown in FIG. 4A, the API model object comprises several sections including a dbprocs section 402, a resourceDetails section 404, and others (resources, dependencies, consumers, config, stash, sspd, etc.) that each comprises one or more sub fields that contain data relating to the API lineage. For example, FIG. 4B is an exemplary dbprocs section 402 of the API model object that can contain data relating to one or more database procedures called by the API, and FIG. 4C is an exemplary resourceDetails section 404 of the API model object that can contain data relating to one or more resources utilized by the API.

In some embodiments, the API model object is a neutral model constructed as an in-memory Java Object representing details associated with the corresponding API—such as API name, API version, framework details, links to ALM tools, API endpoints, API requests, API responses, API consumers, and backend details (e.g., database procedures, HTTP endpoints, etc.).

The API model object generation module 122 stores (218) the constructed API model objects in the API lineage repository 126 for use by, e.g., the UI module 108 in generating various user interface screens and portals (as shown in FIGS. 6A-6E) for interaction by a user of client computing device 102.

Figure 5:
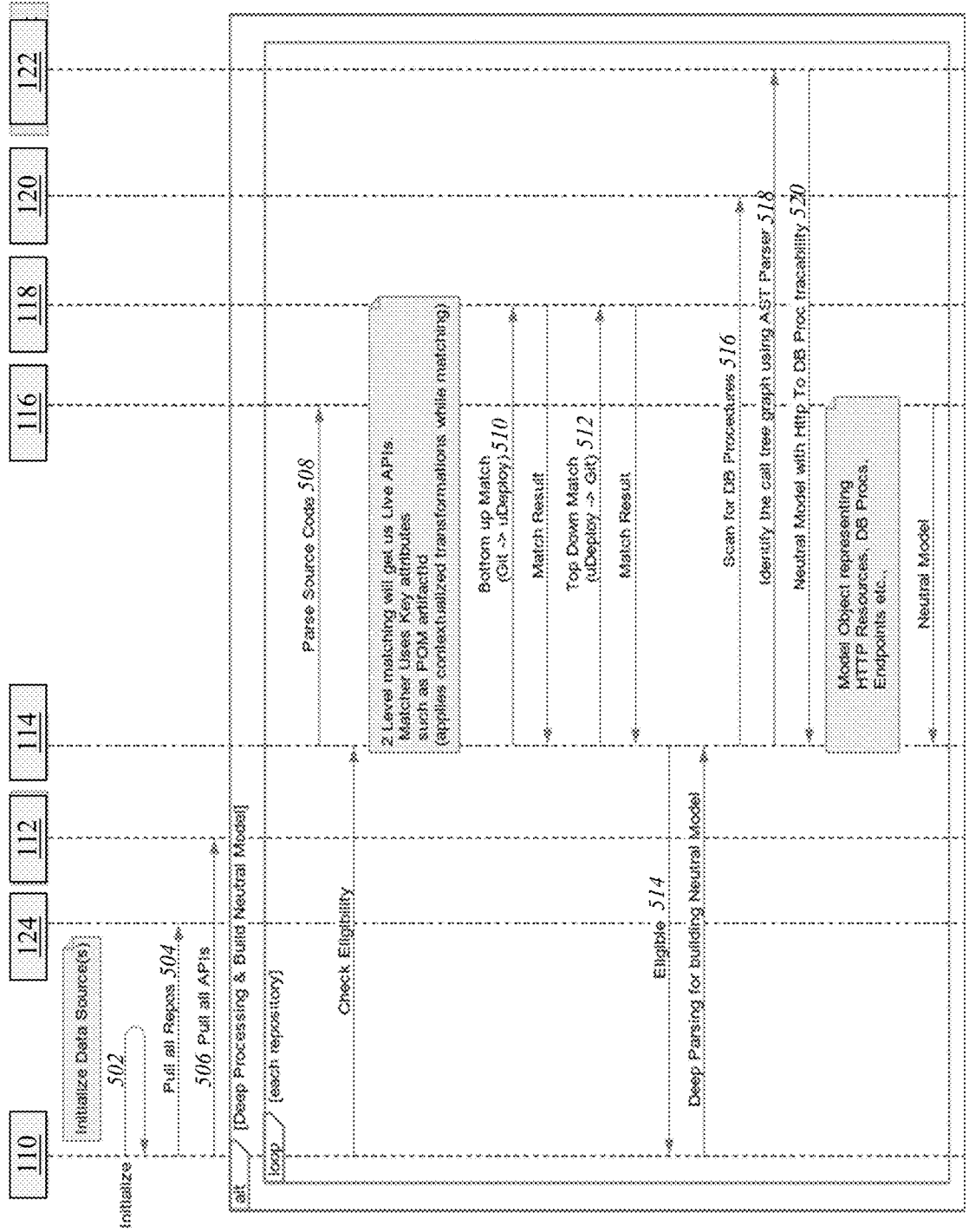
FIG. 5 is a detailed flow diagram of a computerized method of identification and traceability of API functionality in a distributed computing environment.

FIG. 5 is a detailed ladder diagram of a computerized method 500 of identification and traceability of API functionality in a distributed computing environment, using the system 100 of FIG. 1. The method of FIG. 5 follows the same framework as the method of FIG. 2 but provides additional detail regarding the particular functions of the modules described above with respect to FIG. 2.

As shown in FIG. 5, the data collection agent module 110 initializes (502) a connection to the data source(s) (e.g., the source code repositories 124 and the application deployment tool module 112), retrieves (504) the source code files from the source code repositories 124, and retrieves (506) the API definitions from the application deployment tool module 112 as described above in FIG. 2.

For each source code repository, the system 100 loops through a number of steps to build the API model object for each API. First, the core processing module 114 utilizes the code parsing module 116 to parse (508) the retrieved source code and identify one or more APIs based upon API calls in the source code. Then, the core processing module 114 invokes the API comparison module 118 to perform the two-level matching process: (i) conducting (510) a bottom-up match process using the APIs discovered in the source code repositories 124 (e.g., Git) as compared to the APIs discovered in the application deployment tool module 112 (e.g., uDeploy), and (ii) conducting (512) a top-down match process using the APIs discovered in the application deployment tool module 112 (e.g., uDeploy) as compared to the APIs discovered in the source code repositories 124 (e.g., Git). Based upon the matching APIs generated from this matching process, the core processing module 114 determines (514) which APIs are eligible for deep parsing and generation of an API model object.

The core processing module 114 invokes the backend scanning module 120 to scan (516) for backend resources (such as database procedures) that are used by the APIs and also identifies (518) a call graph for each API using an AST parser in the API model object generation module 122. Once the call graph and backend resources are determined, the API model object generation module 122 builds (520) the API model object for each API that includes HTTP to database procedure traceability. The API model object is stored in API lineage repository 126.

As mentioned above, the UI module 108 can be configured to utilize the API model objects to render various user interface screens that provide detailed information relating to the API lineage and API status. FIGS. 6A-6G are exemplary UI screens that display different types of functionality to a user of client computing device 102.

Figure 6A:
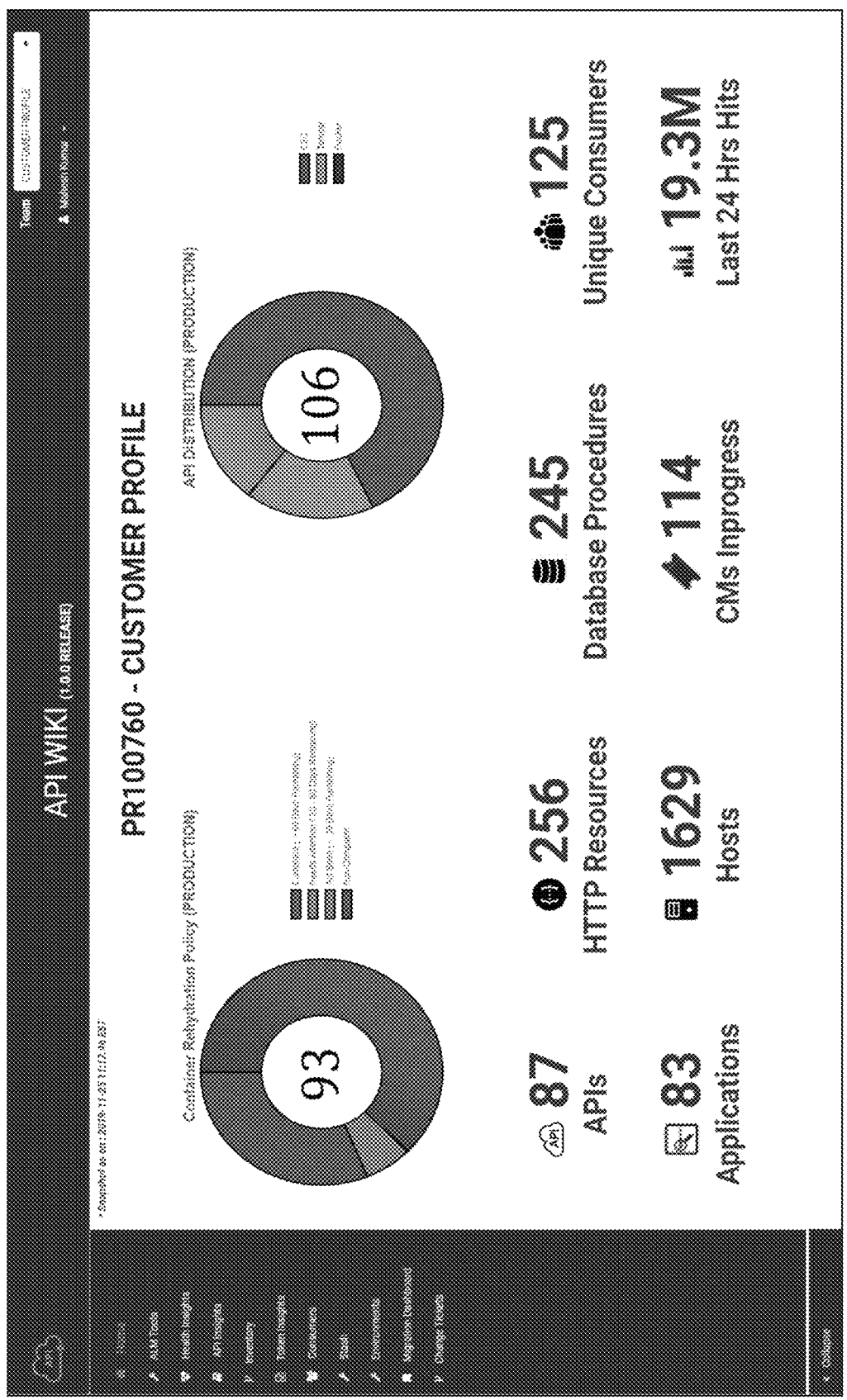
FIG. 6A is a screenshot of a user interface for displaying a summary of the API profile for a software application.

FIG. 6A is a screenshot of a user interface for displaying a summary of the API profile for a particular software application. As shown in FIG. 6A, the software application (PR100760—CUSTOMER PROFILE) comprises 87 different APIs which call, depend upon, or otherwise relate to 256 HTTP resources, 245 database procedures, 114 change management tickets in-progress, and so forth. The summary API profile further provides a graphical representation of the compliance/non-compliance of certain containers in the application, as well as a graph to show the distribution of the APIs across various platforms (e.g., C2C, Tomcat, Docker). The summary API profile advantageously enables a user to quickly see a summary of important API-related metrics associated with a software application.

Figure 6B:
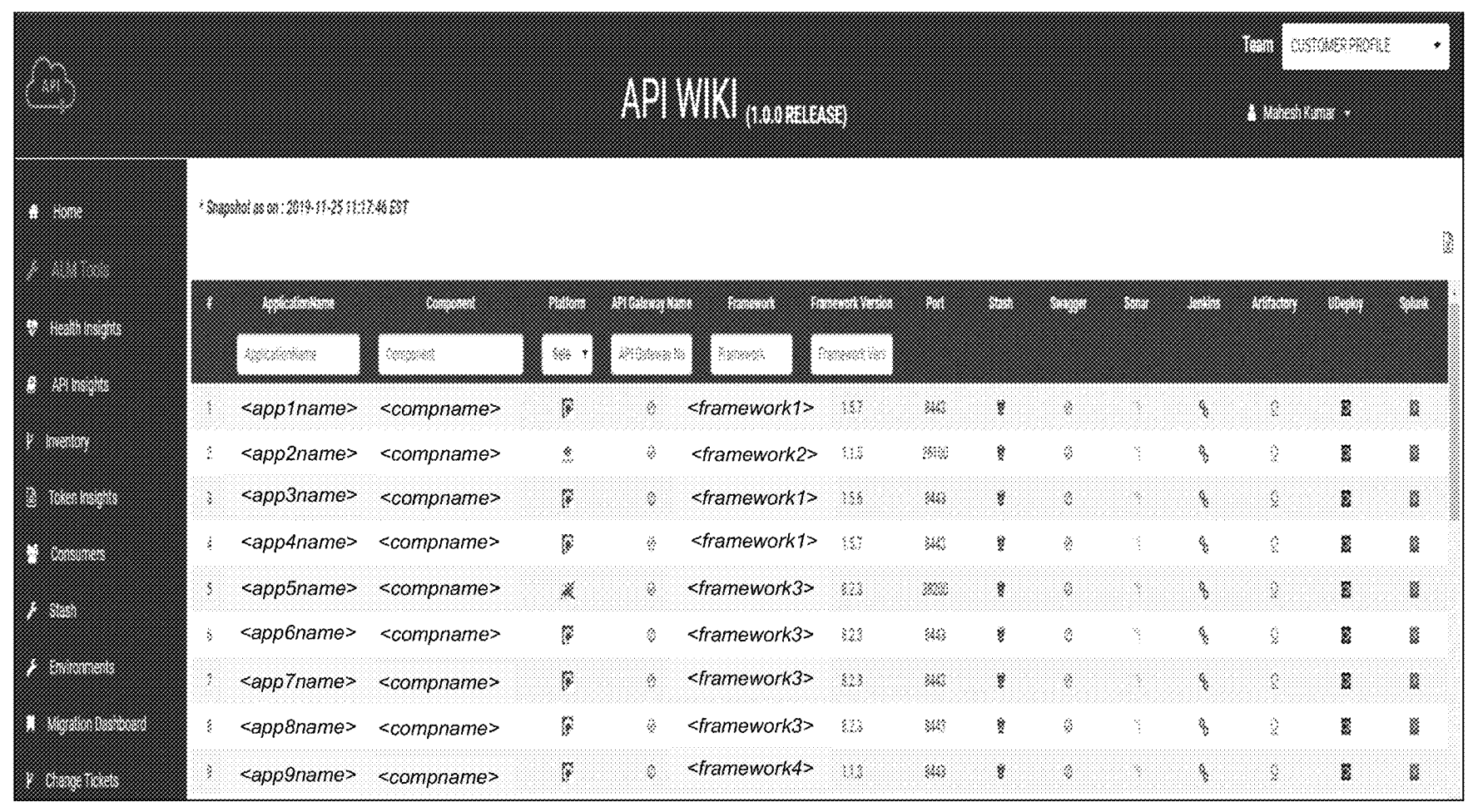

FIG. 6B is a screenshot of a user interface for displaying one or more ALM tools associated with the APIs. As shown in FIG. 6B, the UI provides a list of applications (e.g., LWC-ORCHIDNT-CLOUD) and APIs (also called components—e.g., cp-orchestration-identity) along with several attributes of each API such as:
Platform—e.g., Selenium, Tomcat, Docker, CSC;
API Gateway Name;
API Framework and Framework Version;
Port;
Links to various ALM Tools—e.g., Stash, Swagger, Sonar, Jenkins, Artifactory, uDeploy, Splunk.

Each of the above-referenced links can be activated by a user of client device 102 to direct the user to the corresponding functionality or location in the ALM tool where the API is referenced or located. For example, clicking on a link can launch the associated ALM tool on client device 102 and provide access to the particular details of the API in the ALM tool. In this way, the UI of FIG. 6B provides a seamless way for a user to view the underlying development tools that can be used to examine and/or modify the operation of the API in the production application environment.

Figure 6C:
FIG. 6C is a screenshot of a user interface for providing a health dashboard of APIs in software applications and/or development or production computing environments.

FIG. 6C is a screenshot of a user interface for providing a health dashboard of APIs in software applications and/or development or production computing environments. As shown in FIG. 6C, the health dashboard comprises a matrix of various APIs (also called components) and a visual indicator for each API of the API's health status in certain computing environments (e.g., LTM-DEV, DEV, LTM-SIT, etc.) each provided as a separate column. For example, the API cp-custaddress is in row one of the matrix, and the UI shows a checkmark for the API under the majority of columns—indicating that the API is healthy in those computing environments. For a few of the columns, namely LTM-PIN and PIN, the matrix displays a circle-slash indicator—meaning the API is not used in those computing environments. For other APIs, the UI can display an 'x' indicator—meaning that there is an anomaly or issue with the API in that particular computing environment which should be investigated by the development team.

Figure 6D:
FIG. 6D is a screenshot of a user interface for displaying API traceability information for an API.

FIG. 6D is a screenshot of a user interface for displaying API traceability information for a particular API. As shown in FIG. 6D, the user interface includes lineage and traceability information for a given API (e.g., cp-app-data) in an application (CP-APPDATA-CLOUD). The lineage and traceability information includes HTTP resources (e.g., APPSPECIFICDB0.FEP_APP_DATA_PKG.api_get_fep_app_data) and underlying backend systems (such as database procedure(s)—shown in the right-hand column). In some embodiments, the UI of FIG. 6D can also display certain configuration files for the API (in the bottom section).

Figure 6E:
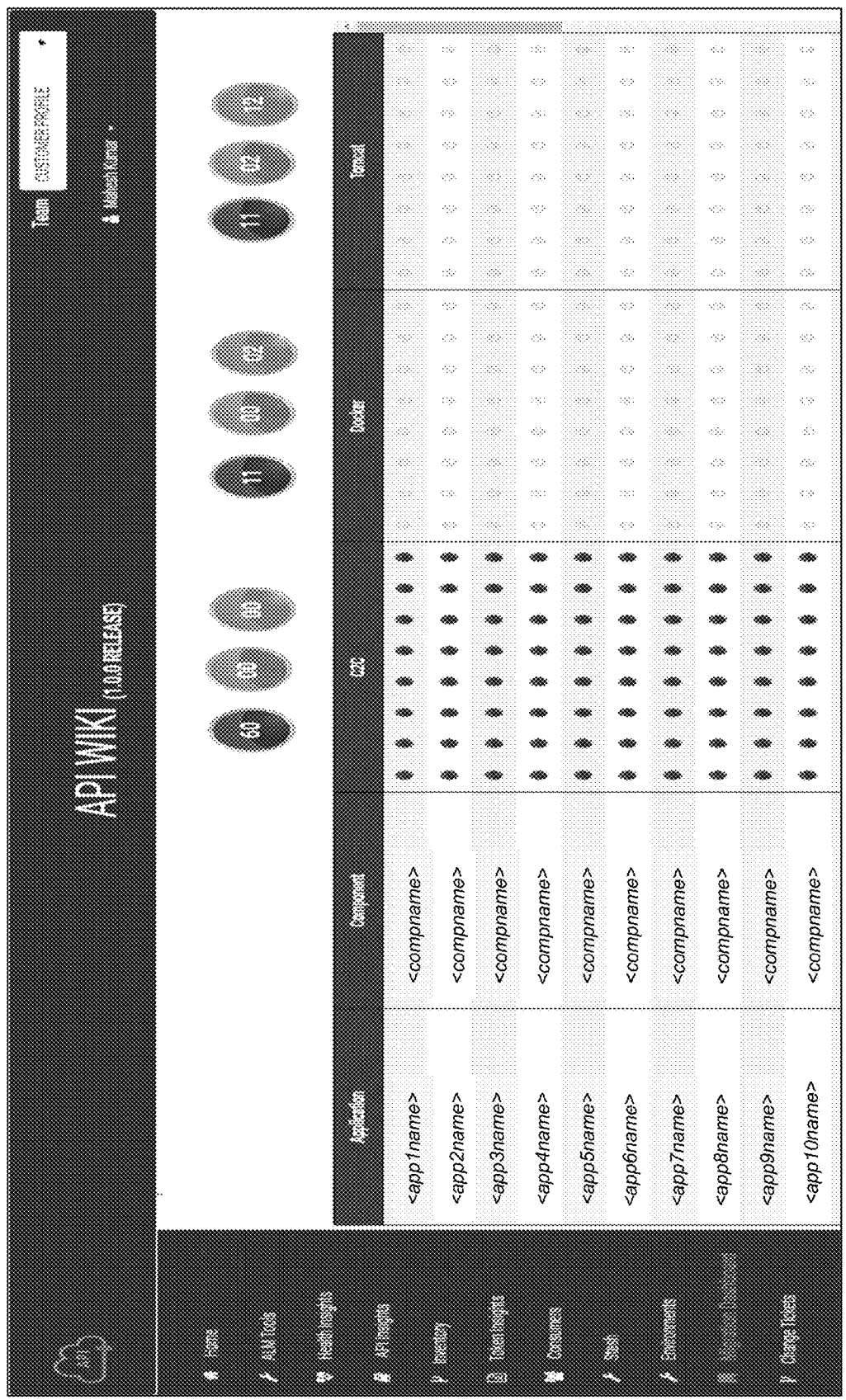
FIG. 6E is a screenshot of a user interface for displaying a matrix of the infrastructure in which an API is running.

FIG. 6E is a screenshot of a user interface for displaying a matrix of the infrastructure in which the APIs are currently running. As shown in FIG. 6E, the matrix lists an application (e.g., CP_ACCTSLEEVES-CLOUD) and API (e.g., cp-acctsleeves) in each row, along with indicators that represent whether the API is currently running on one of a number of platforms (e.g., C2C, Docker, Tomcat). For example, the API cp-acctsleeves is running on the C2C platform (indicated by the dark circles under C2C in row one of the matrix). As can be appreciated, this UI advantageously enables a developer at client device 102 to understand where specific APIs are running in order to develop, e.g., a migration plan to move APIs between platforms or infrastructures.

Figure 6F:
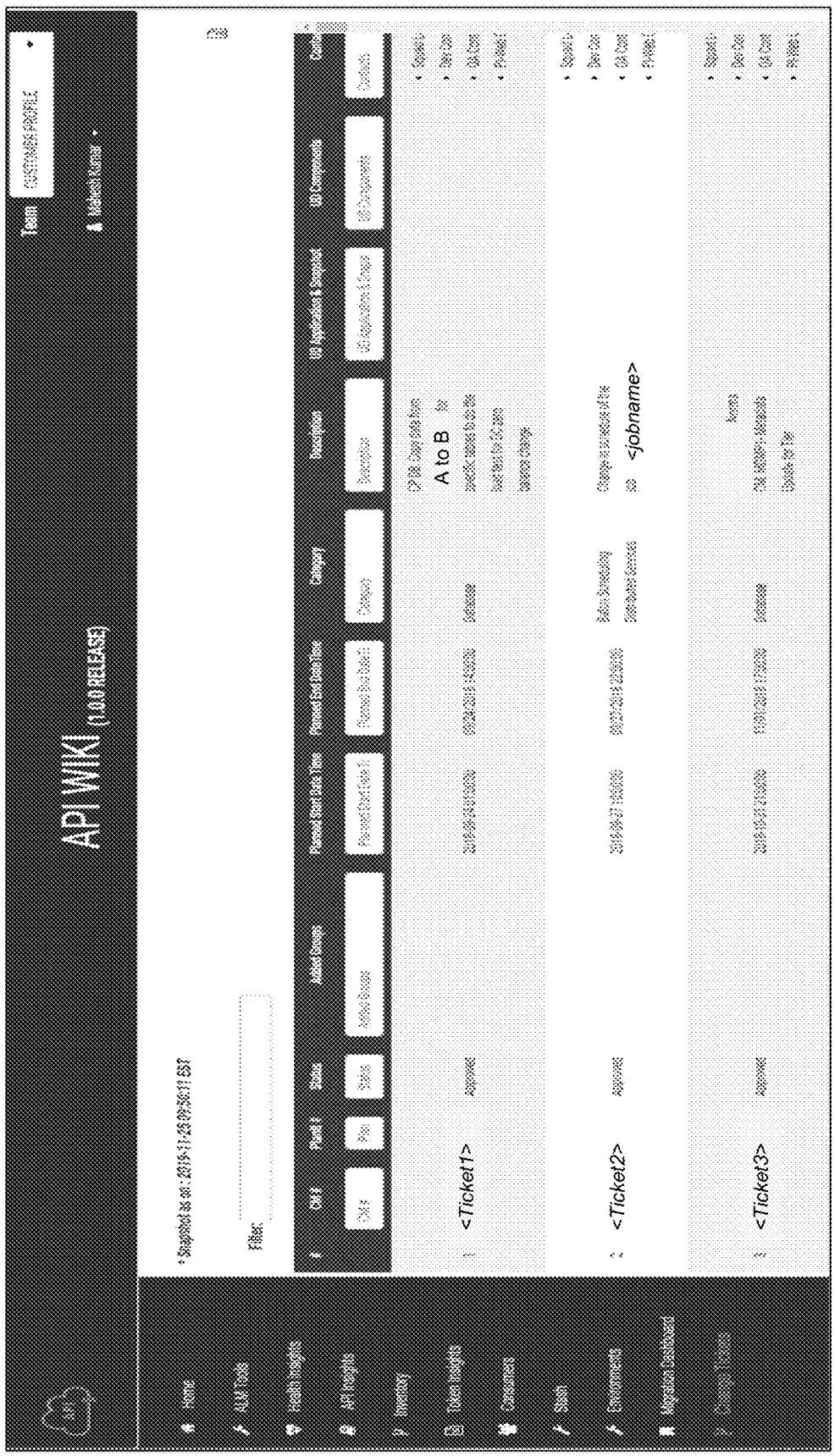
FIG. 6F is a screenshot of a user interface for displaying incident management or change management tickets associated with an API.

FIG. 6F is a screenshot of a user interface for displaying incident management or change management tickets associated with an API. As shown in FIG. 6F, the user interface includes a listing of incident management tickets that relate to one or more of the APIs discovered by the system. Each incident management ticket may be assigned to certain development team(s) for investigation and remediation. For example, a particular incident management ticket may involve changing one or more aspects of the software application and/or computing environment in which the API runs—as a result, this change could impact the operation or integrity of the API. Therefore, this UI provides users with a beneficial view of upcoming changes to the computing environment and enables them to proactively assess whether any APIs will be affected.

Figure 6G:
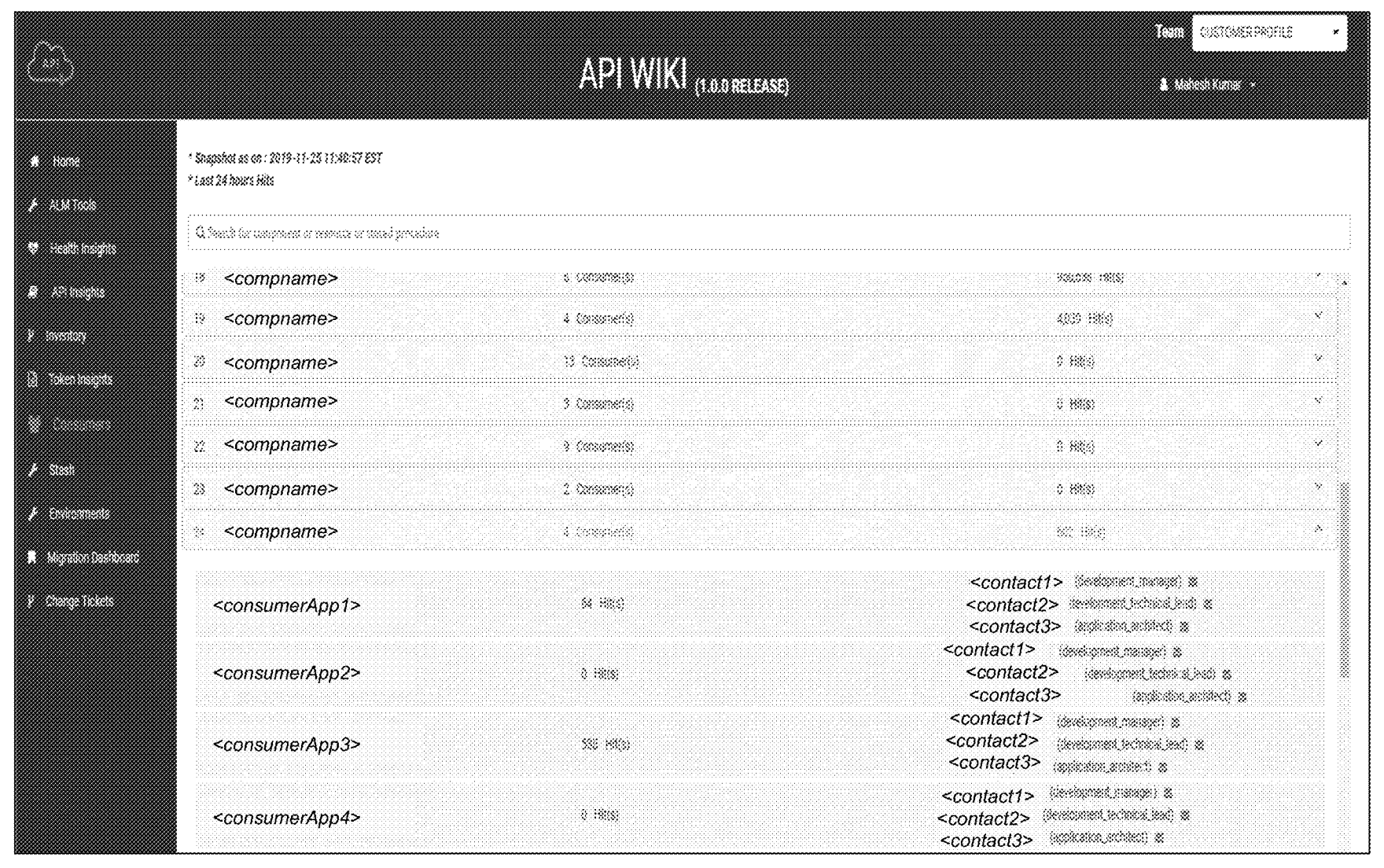

FIG. 6G is a screenshot of a user interface for displaying API consumer information and contact points. As shown in FIG. 6G, the user interface includes details on specific consumers of a particular API (e.g., applications and/or services that call the API or otherwise consume data made available by the API) as well as a number of hits (i.e., time the API is invoked) associated with the consumer and a listing of contact persons (such as development managers, technical leads, application architects, etc.) that have responsibility or oversight for the consuming application or service. For example, the API cp-acctgoals has 4 consumers (Customer Profile, Offers and Referrals, Portfolio Cash Management System, and API KeyManager), where Customer Profile has 64 hits and Portfolio Cash Management System has 538 hits. This UI provides an efficient mechanism for a user at client device 102 to identify which service(s) or application(s) rely upon a particular API as well as the extent to which the API is used. The contact listing enables the user to reach out to specific contact points in order to raise issues with respect to the API or get clarification of specific attributes or features of the application or service.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for identification and traceability of application programming interface (API) functionality in a distributed computing environment, the system comprising a server computing device having a memory that stores computer-executable instructions and a processor that executes the computer-executable instructions to:

retrieve source code comprising one or more API calls from a plurality of source code repositories;

parse the retrieved source code to identify a first set of APIs referenced by the one or more API calls, each API in the first set of APIs having one or more attributes;

retrieve one or more API definitions from an application deployment tool;

parse the retrieved API definitions to identify a second set of APIs, each API in the second set of APIs having one or more attributes;

compare the first set of APIs and the second set of APIs using the respective attributes of each API to determine a set of matching APIs, comprising:

for each API in the first set of APIs, comparing one or more attributes of the API to corresponding attributes of each API in the second set of APIs to determine whether the attributes match and generating a first subset of matching APIs;

for each API in the second set of APIs, comparing one or more attributes of the API to corresponding attributes of each API in the first set of APIs to determine whether the attributes match and generating a second subset of matching APIs;

filtering the first subset of matching APIs and the second subset of matching APIs to identify one or more APIs common to the first subset of matching APIs and the second subset of matching APIs; and generating the set of matching APIs using the identified one or more APIs common to the first subset of matching APIs and the second subset of matching APIs;

using the set of matching APIs:
  detect one or more backend systems associated with each API in the set of matching APIs;
  generate a call graph for each API in the set of matching APIs by traversing one or more abstract syntax trees (ASTs) associated with the source code of the set of matching APIs, the call graph comprising an end-to-end lineage for the API in the set of matching APIs;
  build an API model object for each API in the set of matching APIs, the API model object comprising (i) the one or more attributes of the API in the set of matching APIs, (ii) the detected backend systems associated with the API in the set of matching APIs, and (iii) the call graph for the API in the set of matching APIs; and
  store the API model object for each API in the set of matching APIs in an API lineage repository.

2. The system of claim 1, wherein the source code corresponds to a software application executing in a production computing environment.

3. The system of claim 1, wherein the one or more attributes of each API in the first set of APIs and the one or more attributes of each API in the second set of APIs comprises one or more of: a name, a version, an artifactid, a groupid, a tokenid, or a link to an application lifecycle management (ALM) tool associated with the API.

4. The system of claim 1, wherein detecting one or more backend systems associated with each API in the set of matching APIs comprises scanning the application deployment tool to identify one or more backend systems invoked by the API in the set of matching APIs.

5. The system of claim 1, wherein the call graph comprises one or more Hypertext Transfer Protocol (HTTP) endpoints associated with the API in the set of matching APIs, one or more consumers of the API in the set of matching APIs, one or more requests of the API in the set of matching APIs, and one or more responses of the API in the set of matching APIs.

6. The system of claim 1, wherein the server computing device generates a user interface on a remote computing device for display of data associated with the API model objects.

7. The system of claim 6, wherein the user interface comprises a summary of APIs used by a software application in a production computing environment.

8. The system of claim 6, wherein the user interface comprises a list of application lifecycle management (ALM) tools associated with an API.

9. The system of claim 6, wherein the user interface comprises a health status of a plurality of APIs in one or more computing environments.

10. The system of claim 6, wherein the user interface comprises end-to-end traceability information for one or more APIs.

11. The system of claim 6, wherein the user interface comprises a list of development change tickets associated with one or more APIs.

12. The system of claim 1, wherein the server computing device detects one or more anomalies in the API model object for one or more APIs and transmits a notification message to an incident management system, wherein the incident management system generates one or more issue tickets based upon the detected anomalies.

13. A computerized method of identification and traceability of application programming interface (API) functionality in a distributed computing environment, the method comprising:
  retrieving, by a server computing device, source code comprising one or more API calls from a plurality of source code repositories;
  parsing, by the server computing device, the retrieved source code to identify a first set of APIs referenced by the one or more API calls, each API in the first set of APIs having one or more attributes;
  retrieving, by the server computing device, one or more API definitions from an application deployment tool;
  parsing, by the server computing device, the retrieved API definitions to identify a second set of APIs, each API in the second set of APIs having one or more attributes;
  comparing, by the server computing device, the first set of APIs and the second set of APIs using the respective attributes of each API to determine a set of matching APIs, comprising:
    for each API in the first set of APIs, comparing one or more attributes of the API to corresponding attributes of each API in the second set of APIs to determine whether the attributes match and generating a first subset of matching APIs;
    for each API in the second set of APIs, comparing one or more attributes of the API to corresponding attributes of each API in the first set of APIs to determine whether the attributes match and generating a second subset of matching APIs;
    filtering the first subset of matching APIs and the second subset of matching APIs to identify one or more APIs common to the first subset of matching APIs and the second subset of matching APIs; and
    generating the set of matching APIs using the identified one or more APIs common to the first subset of matching APIs and the second subset of matching APIs;
  using the set of matching APIs:
    detecting, by the server computing device, one or more backend systems associated with each API in the set of matching APIs;
    generating, by the server computing device, a call graph for each API in the set of matching APIs by traversing one or more abstract syntax trees (ASTs) associated with the source code of the set of matching APIs, the call graph comprising an end-to-end lineage for the API in the set of matching APIs;
    building, by the server computing device, an API model object for each API in the set of matching APIs, the API model object comprising (i) the one or more attributes of the API in the set of matching APIs, (ii) the detected backend systems associated with the API in the set of matching APIs, and (iii) the call graph for the API in the set of matching APIs; and
    storing, by the server computing device, the API model object for each API in the set of matching APIs in an API lineage repository.

14. The method of claim 13, wherein the source code corresponds to a software application executing in a production computing environment.

15. The method of claim 13, wherein the one or more attributes of each API in the first set of APIs and the one or more attributes of each API in the second set of APIs comprises one or more of: a name, a version, an artifactid, a groupid, a tokenid, or a link to an application lifecycle management (ALM) tool associated with the API.

16. The method of claim 13, wherein detecting one or more backend systems associated with each API in the set of matching APIs comprises scanning, by the server computing device, the application deployment tool to identify one or more backend systems invoked by the API in the set of matching APIs.

17. The method of claim 13, wherein the call graph comprises one or more Hypertext Transfer Protocol (HTTP) endpoints associated with the API in the set of matching APIs, one or more consumers of the API in the set of matching APIs, one or more requests of the API in the set of matching APIs, and one or more responses of the API in the set of matching APIs.

18. The method of claim 13, wherein the server computing device generates a user interface on a remote computing device for display of data associated with the API model objects.

19. The method of claim 18, wherein the user interface comprises a summary of APIs used by a software application in a production computing environment.

20. The method of claim 18, wherein the user interface comprises a list of application lifecycle management (ALM) tools associated with an API.

21. The method of claim 18, wherein the user interface comprises a health status of a plurality of APIs in one or more computing environments.

22. The method of claim 18, wherein the user interface comprises end-to-end traceability information for one or more APIs.

23. The method of claim 18, wherein the user interface comprises a list of development change tickets associated with one or more APIs.

24. The method of claim 18, wherein the server computing device detects one or more anomalies in the API model object for one or more APIs and transmits a notification message to an incident management system, wherein the incident management system generates one or more issue tickets based upon the detected anomalies.

\* \* \* \* \*